US 11,682,867 B2

(12) United States Patent
Stross et al.

(10) Patent No.: US 11,682,867 B2
(45) Date of Patent: Jun. 20, 2023

(54) MAINS PLUG AND CHARGING SYSTEM FOR A MOTOR VEHICLE

(71) Applicant: TE Connectivity Germany GmbH, Bensheim (DE)

(72) Inventors: Stefan Stross, Dielheim (DE); Christian Matthies, Frankenthal (DE)

(73) Assignee: TE Connectivity Germany GmbH, Bensheim (DE)

( * ) Notice: Subject to any disclaimer, the term of this patent is extended or adjusted under 35 U.S.C. 154(b) by 917 days.

(21) Appl. No.: 16/420,378

(22) Filed: May 23, 2019

(65) Prior Publication Data

US 2019/0280436 A1 Sep. 12, 2019

Related U.S. Application Data

(63) Continuation of application No. PCT/EP2017/080050, filed on Nov. 22, 2017.

(30) Foreign Application Priority Data

Nov. 23, 2016 (DE) .................... 10 2016 122 616.5

(51) Int. Cl.
  *H01R 13/405* (2006.01)
  *H02J 7/00* (2006.01)
  (Continued)

(52) U.S. Cl.
  CPC .......... *H01R 13/6683* (2013.01); *B60L 53/16* (2019.02); *B60L 53/305* (2019.02);
  (Continued)

(58) Field of Classification Search
  CPC .......... B60L 53/00; B60L 53/10; B60L 53/50; B60L 53/53; B60L 53/62; B60L 53/66;
  (Continued)

(56) References Cited

U.S. PATENT DOCUMENTS

2004/0145912 A1* 7/2004 Chien .................. F21V 33/006
  362/555
2009/0316321 A1* 12/2009 Ouwerkerk ............ B60L 53/16
  361/103
(Continued)

FOREIGN PATENT DOCUMENTS

CN      102983851 A  *  3/2013  .......... H03K 17/955
DE    202009013675 U1     3/2011
(Continued)

OTHER PUBLICATIONS

PCT Notification of Transmittal, International Search Report and the Written Opinion of the International Searching Authority, International Application No. PCT/EP2017/080050, dated Mar. 27, 2018, 15 pages.
Abstract of WO 2011054854, also published as DE 20 2009 013675, dated May 12, 2011, 1 page.
Abstract translation of DE 10 2013 226628, dated Jun. 25, 2015, 1 page.
(Continued)

*Primary Examiner* — Edward Tso
(74) *Attorney, Agent, or Firm* — Barley Sndyer

(57) ABSTRACT

A mains plug for connecting a charging system of a motor vehicle to a socket outlet of an alternating current network comprises a contact housing having a first gripping area and a sensor unit having a first sensor electrode embedded in the contact housing. A first section of the contact housing is arranged between a first surface of the first gripping area and the first sensor electrode.

21 Claims, 7 Drawing Sheets

(51) Int. Cl.
   *B60L 53/16* (2019.01)
   *H01R 13/66* (2006.01)
   *B60L 53/30* (2019.01)

(52) U.S. Cl.
   CPC .......... *H01R 13/405* (2013.01); *H02J 7/0045* (2013.01); *H01R 2201/26* (2013.01); *Y02T 10/70* (2013.01); *Y02T 10/7072* (2013.01); *Y02T 90/14* (2013.01)

(58) Field of Classification Search
   CPC ..... B60L 53/305; B60L 53/16; H01R 13/405; H01R 2201/26; H02J 7/0045; H02J 7/00; Y02T 10/70; Y02T 10/7072; Y02T 90/14; Y02T 90/12; Y02T 90/16
   USPC .......................... 320/104, 109; 439/913, 923
   See application file for complete search history.

(56) References Cited

U.S. PATENT DOCUMENTS

| 2012/0119702 A1* | 5/2012 | Gaul | H01R 13/665 439/620.21 |
| 2016/0075244 A1* | 3/2016 | Im | B60L 53/14 320/107 |

FOREIGN PATENT DOCUMENTS

| DE | 102013212739 B3 | 4/2014 |
| DE | 102013226628 A1 | 6/2015 |

OTHER PUBLICATIONS

Abstract translation of DE 10 2013 212739, dated Apr. 12, 2014, 1 page.
Chinese Second Office Action with English translation, Application No. 201780072018.4, dated Aug. 2, 2022, 15 pages.

* cited by examiner

MAINS PLUG AND CHARGING SYSTEM FOR A MOTOR VEHICLE

CROSS-REFERENCE TO RELATED APPLICATIONS

This application is a continuation of PCT International Application No. PCT/EP2017/080050, filed on Nov. 22, 2017, which claims priority under 35 U.S.C. § 119 to German Patent Application No. 102016122616.5, filed on Nov. 23, 2016.

FIELD OF THE INVENTION

The present invention relates to a charging system and, more particularly, to a mains plug of a charging system.

BACKGROUND

A charging system, specifically for electric vehicles, having a charging device-side plug-in connector and a sensor is known from German Patent Application No. 202009013675 U1. The sensor emits a signal if a human body part approaches the plug-in charging system and/or if a human body part touches the plug-in charging system.

SUMMARY

A mains plug for connecting a charging system of a motor vehicle to a socket outlet of an alternating current network comprises a contact housing having a first gripping area and a sensor unit having a first sensor electrode embedded in the contact housing. A first section of the contact housing is arranged between a first surface of the first gripping area and the first sensor electrode.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
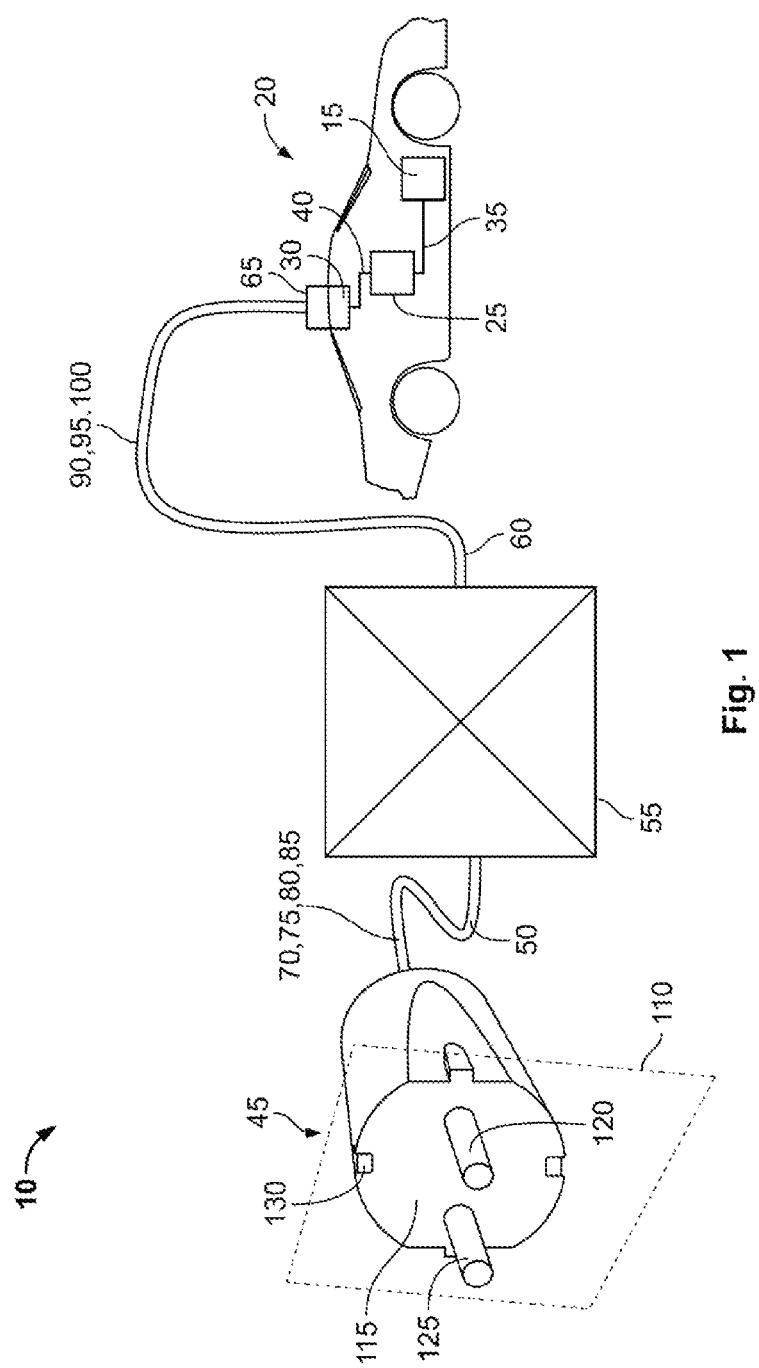
FIG. 1 is a schematic diagram of a charging system according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will convey the concept of the disclosure to those skilled in the art.

In the following figures, reference is made to a coordinate system 5. The coordinate system 5 is configured as a right-handed coordinate system, and has a x-axis, a y-axis and a z-axis.

A charging system 10 according to an embodiment for charging an electrical energy accumulator 15 of a motor vehicle 20 is shown in FIG. 1. The motor vehicle 20 can be configured as a hybrid vehicle or as an electric vehicle; at least part of the propulsion energy is stored in the electrical energy accumulator 15 of the motor vehicle 20. The electrical energy accumulator 15 can be, for example, a lithium-air accumulator. In other embodiments, the electrical energy accumulator 15 may be configured in a different form.

The charging system 10, as shown in FIG. 1, comprises a charging device 25. In an embodiment, the charging device 25 is installed in the motor vehicle 20 and executes the control and/or regulation of a process for the charging of the electrical energy accumulator 15 with electrical energy from a permanent electrical network, such as a permanent alternating current network.

The charging system 10, as shown in FIG. 1, comprises a first vehicle terminal 30, which is arranged in the motor vehicle 20. The charging device 25 is electrically connected to the electrical energy accumulator 15 of the motor vehicle 20 by a first connection 35. The charging device 25 is electrically connected to the first vehicle terminal 30 by a second connection 40.

The charging system 10, as shown in FIG. 1, comprises a mains plug 45, a monitoring circuit 55, and a second vehicle terminal 65. The mains plug 45, the monitoring circuit 55, and the second vehicle terminal 65 are configured in a stationary arrangement and, in the shown embodiment, are not installed in the motor vehicle 15.

As shown in FIG. 1, the mains plug 45 comprises a first cable 50 and the monitoring circuit 55 comprises a second cable 60. The first cable 50 comprises a first electrical conductor 70, an exemplary second electrical conductor 75, a first protective conductor 80, and a signal line 85. The first electrical conductor 70, the second electrical conductor 75, the first protective conductor 80 and the signal line 85 are configured in the first cable 50 in a mutually electrically insulated arrangement. The second cable 60 incorporates a third electrical conductor 90, a fourth electrical conductor 95, and a second protective conductor 100.

The mains plug 45 connects the charging system 10 to a socket outlet 110 of the permanent electrical network. The first vehicle terminal 30 is connected to the second vehicle terminal 65, and thus constitutes an electrical coupling between the first vehicle terminal 30 and the second vehicle terminal 65.

Figure 2:
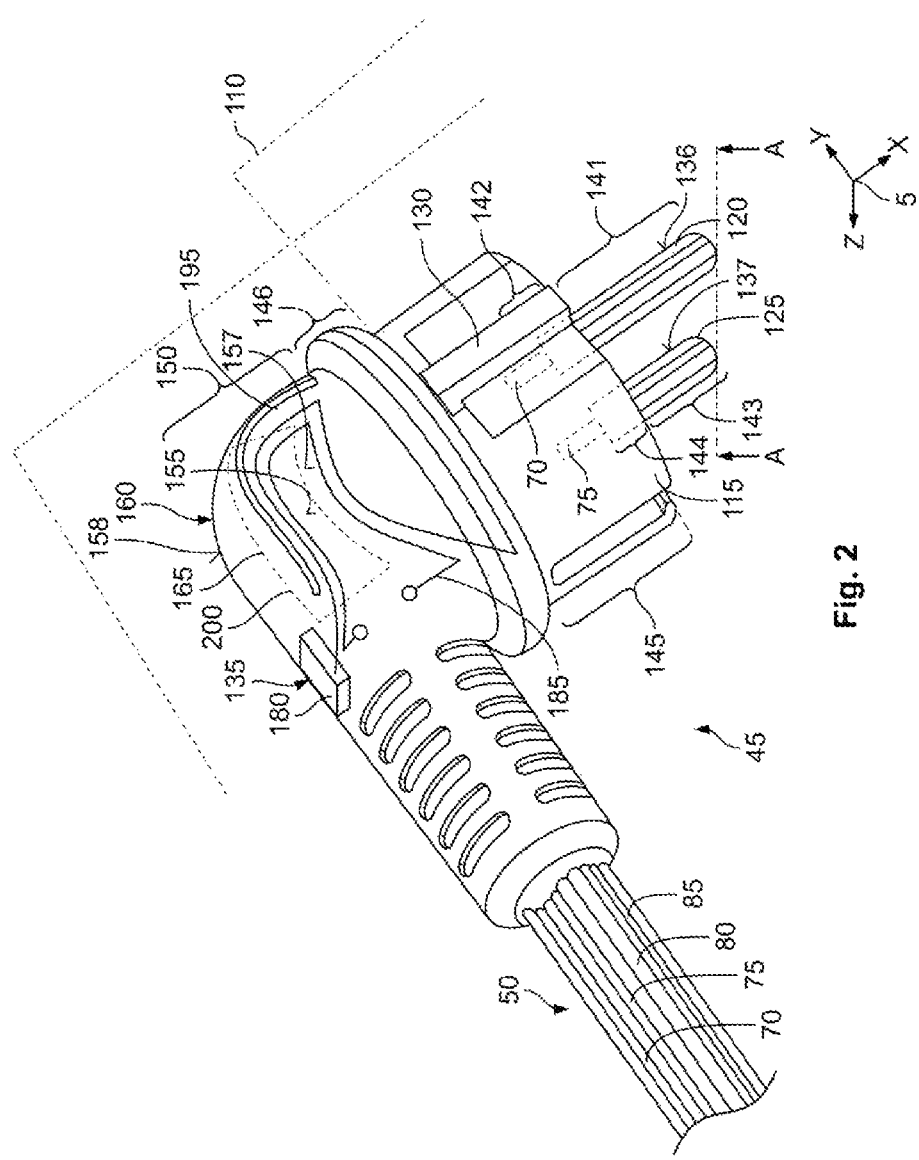
FIG. 2 is a perspective view of a mains plug of the charging system of FIG. 1.
Figure 3:
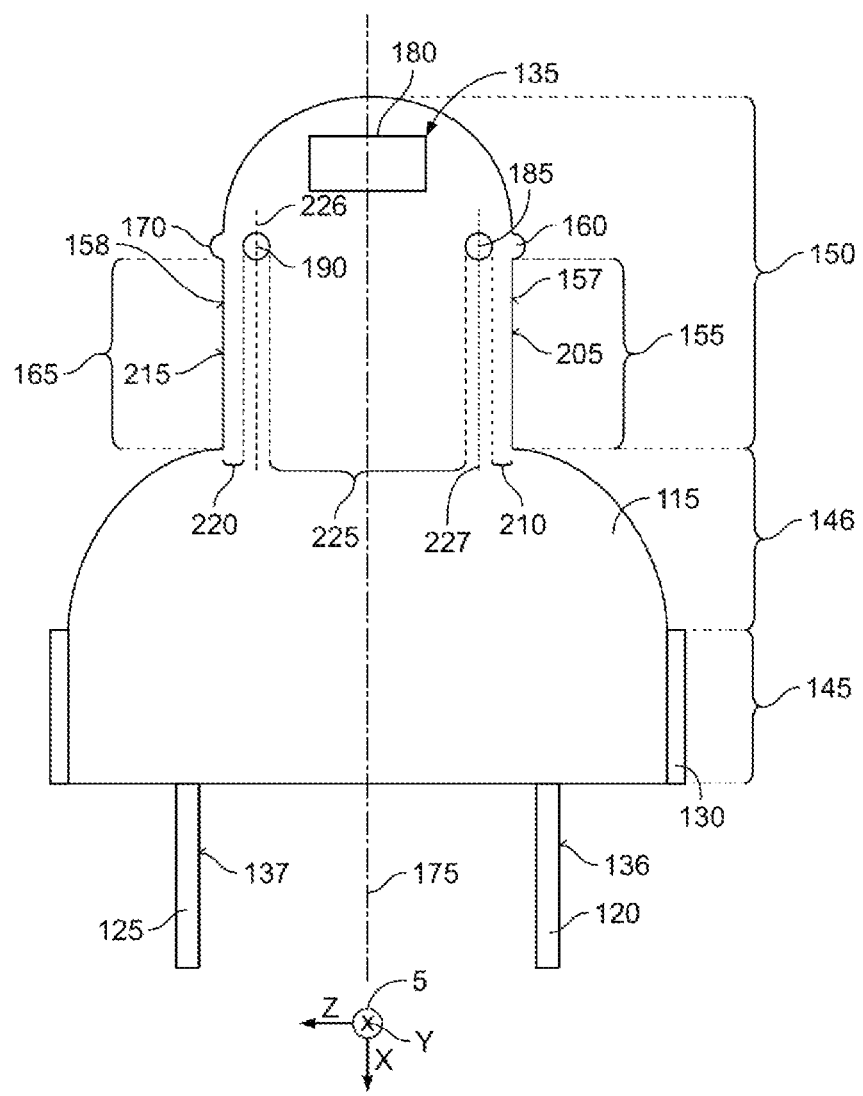
FIG. 3 is a sectional side view of the mains plug, taken along plane A-A of FIG. 2.

A mains plug 45 of the charging system 10 shown in FIG. 1 is shown in FIGS. 2 and 3. The mains plug 45 comprises a contact housing 115, a first contact element 120, a second contact element 125, a protective contact 130, and a sensor unit 135.

As shown in FIG. 2, the first contact element 120 and the second contact element 125 each have a pin-shaped design and extend in the x-direction. The first contact element 120 is arranged offset in relation to the second contact element 125 in the z-direction. The first contact element 120 is electrically connected to the first electrical conductor 70 and the second contact element 125 is electrically connected to the second electrical conductor 75. The first contact element 120 and the second contact element 125 are arranged on a side of the contact housing 115 which faces the socket outlet 110.

The first contact element 120, as shown in FIG. 2, has a first pin section 141 and a first contact element section 142. The second contact element 125 has a second pin section 143 and a second contact element section 144. The first contact element section 142 and the second contact element section 144 are embedded in the contact housing 115. The first pin section 141 of the first contact element 120 and the second pin section 143 of the second contact element 125 project from the contact housing 115, on an end face of the contact housing 115 which faces the socket outlet 110, outwardly from the contact housing 115. The pin sections 141, 143 extend in a plug-in direction (x-direction) of the contact element 120, 125, such that the pin section 141, 143 is inserted in a jack socket of the socket outlet 110 which is respectively assigned to the pin section 141, 143. The contact element 120, 125 is mechanically attached to the contact housing 115 by the contact element section 142, 144. In an embodiment, the first electrical conductor 70 can be connected to the first contact element section 142, and the second electrical conductor 75 can be connected to the second contact element section 144.

On a circumferential side, as shown in FIG. 2, the first pin section 141 has a first contact surface 136 and, on a circumferential side, the second pin section 143 has a second contact surface 137. If the mains plug 45 is inserted in the socket outlet 110, the first contact surface 136 forms a first electrical contact with a first jack socket of the socket outlet 110. With the mains plug 45 in the plugged-in state in the socket outlet 110, the second contact surface 137 forms a second electrical contact with a second jack socket of the socket outlet 110.

The contact housing 115, as shown in FIGS. 2 and 3, has a first housing region 145, a second housing region 150, and a third housing region 146. The third housing region 146 is arranged in the x-direction between the first housing region 145 and the second housing region 150. On the second housing region 150, the contact housing 115 has a first gripping area 155 and a first projection 160 on a first lateral surface 157, and a second gripping area 165 and a second projection 170 on a second lateral surface 158, arranged opposite the first lateral surface 157. In the x-direction, the first gripping area 155 and the second gripping area 165 are arranged at the same height. In the z-direction, the first gripping area 155 and the second gripping area 165 are arranged with a mutual clearance. The gripping area 155, 165 is delimited on a side facing the contact element 120, 125 by the third housing region 146.

The third housing region 146, as shown in FIGS. 2 and 3, has an exemplary cup-shaped design and tapers from the first housing region 145 in the direction of the second housing region 150. In the z-direction, the second housing region 150 has a narrower dimension than the first housing region 145. On a side which is opposite the contact element 120, 125, the first gripping area 155 is delimited by the first projection 160 and the second gripping area 165 is delimited by the second projection 170. The projection 160, 170 is arranged with a clearance of approximately one finger's width from an upper end of the third housing region 146 in the x-direction. The projection 160, 170 extends in the z-direction. The function of the projection 160, 170 is to permit the particularly effective gripping of the body component, thereby facilitating the withdrawal of the first housing region 145 and the contact element 120, 125 from the socket outlet 110.

The protective contact 130, as shown in FIGS. 2 and 3, is arranged laterally on the first housing region 145 of the contact housing 115 which is configured to match the socket outlet 110. In the fitted state of the mains plug 45 in the socket outlet 110, the first housing region 145 is circumferentially enclosed by the socket outlet 110. The protective contact 130 is electrically connected to the first protective conductor 80.

As shown in FIG. 3, the second projection 170 extends in the z-direction, in the opposite direction to the first projection 160. The first gripping area 155 and/or the first projection 160, and the second gripping area 165 and/or the second projection 170, are arranged with mirror-image symmetry to a plane of symmetry 175, which is arranged between the first gripping area 155 and the second gripping area 165 and is, for example, an xy-plane. The plane of symmetry 175 is centrally arranged between the first contact element 120 and the second contact element 125. By the opposing arrangement, a reliable gripping of the mains plug 45 is ensured. The projection 160, 170, at least in part, is configured transversely to the plug-in direction (x-direction) of the contact element 120, 125.

The gripping area 155, 165, as shown in FIGS. 2 and 3, is essentially arranged in parallel to the plug-in direction of the contact element 120, 125. The first projection 160 incorporates a first projection outline 195 and the second projection 170 incorporates a second projection outline 200. The first projection outline 195 and/or the second projection outline 200 can be configured, for example, with an L-shaped or U-shaped design.

The sensor unit 135, as shown in FIGS. 2 and 3, has a sensor circuit 180, a first sensor electrode 185, and a second sensor electrode 190. The sensor electrode 185, 190 can comprise, for example, a wire and/or a leadframe and/or an electrically-conductive plastic. The first sensor electrode 185 and the second sensor electrode 190 can be arranged on a common leadframe, or on a leadframe which is respectively assigned to each of the sensor electrodes 185, 190. In an embodiment, the sensor circuit 180, the first sensor electrode 185, and the second sensor electrode 190 are arranged on a common leadframe. The sensor unit 135 is completely embedded in a material of the contact housing 115. The material is, for example, electrically insulating, and is a plastic in an embodiment.

During the manufacture of the mains plug 45, the sensor electrode 185, 190 and the sensor circuit 180 are molded with the material of the contact housing 115, in an injection mold. The first sensor electrode 185 is arranged adjacently to the first projection 160, at an equal height in the x-direction. The second sensor electrode 190 is arranged adjacently to the second projection 170, at an equal height in the x-direction.

In an embodiment, the sensor electrode 185, 190 can be configured with a meander-shaped design. As shown in FIG. 2, the first sensor electrode 185 is at least partially arranged in parallel with the first projection outline 195, and the second sensor electrode 190 is at least partially arranged in parallel with the second projection outline 200.

The contact housing 115, as shown in FIG. 3, has a first section 210 between a first surface 205 of the first gripping area 155 and the first sensor electrode 185. The first section 210 electrically insulates the first sensor electrode 185 from the first gripping area 155. The contact housing 115 has a second section 220 between a second surface 215 of the second gripping area 165 and the second sensor electrode 190. The second section 220 electrically insulates the second sensor electrode 190 from the second surface 215. The contact housing 115 has a third section 225 between the first sensor electrode 185 and the second sensor electrode 190.

The third section 225 electrically insulates the first sensor electrode 185 from the second sensor electrode 190.

The first sensor electrode 185 is arranged in a first area 227, as shown in FIG. 3, in a first plane. The first area 227 is arranged in parallel with the first surface 205. The second sensor electrode 190 is arranged in a second area 226, in a second plane. The second area 226 can be arranged in parallel with the first area 227 of the first sensor electrode 185. The second area 226 is arranged in parallel with the second surface 215.

Figure 4:
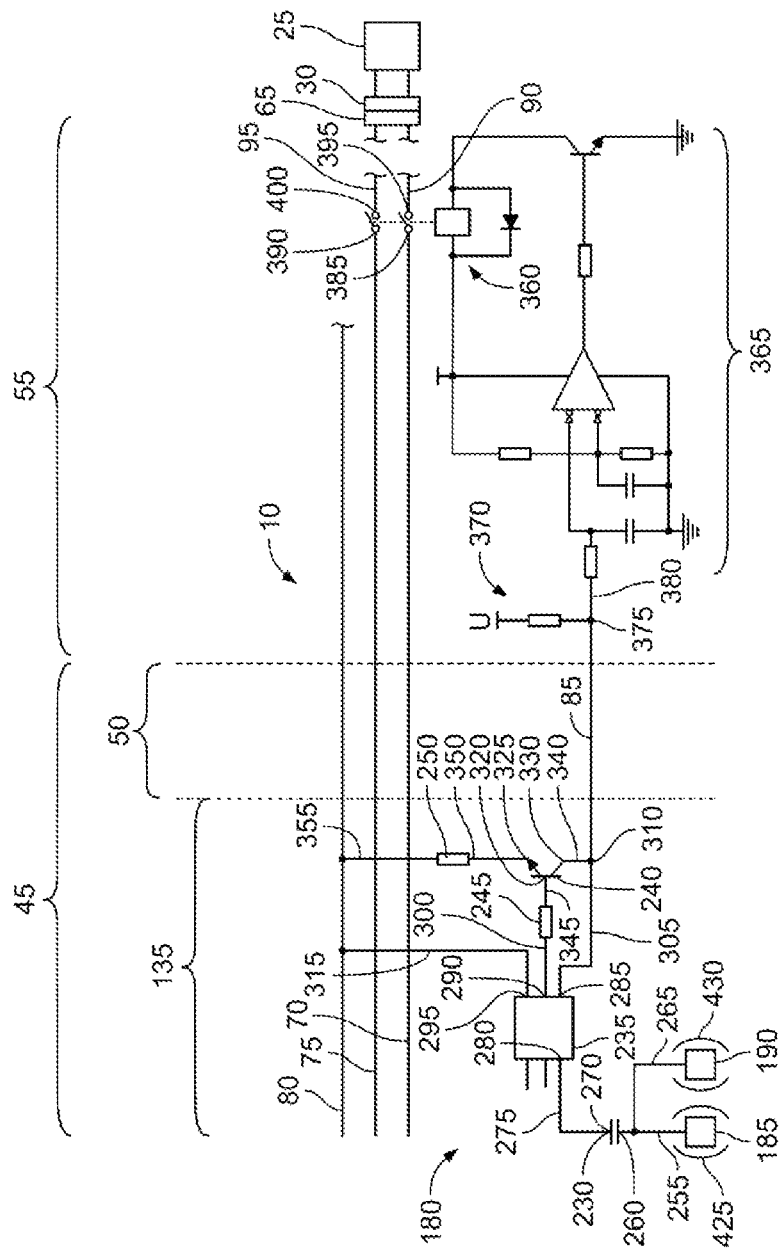
FIG. 4 is a circuit diagram of the charging system of FIG. 1.

A circuit diagram of the charging system 10 is shown in FIG. 4. The sensor circuit 180 incorporates a measuring capacitor 230, a capacitive proximity sensor 235, a bipolar transistor 240, a first predefined electrical resistance 245, and a second predefined electrical resistance 250.

As shown in FIG. 4, the first sensor electrode 185 is electrically connected to a first side 260 of the measuring capacitor 230 by a third connection 255. The second sensor electrode 190 is electrically connected to the first side 260 of the measuring capacitor 230 by a fourth connection 265.

The capacitive proximity sensor 235, as shown in FIG. 4, comprises a first supply terminal 280, a second supply terminal 285, a signal terminal 290, and a ground terminal 295. The capacitive proximity sensor 235 can, for example, be of the AT42QT1010 type.

A fifth connection 275, as shown in FIG. 4, electrically connects the first supply terminal 280 to a second side 270 of the measuring capacitor 230. The signal terminal 290 is electrically connected to a first side of the first electrical resistor 245 by a sixth connection 300. The second supply terminal 285 is electrically connected to a first junction 310 by a seventh connection 305. The ground terminal 295 is electrically connected to the first protective conductor 80 by an eighth connection 315.

In an embodiment, the bipolar transistor 240 is a NPN-doped bipolar transistor. The bipolar transistor 240, as shown in FIG. 4, comprises a base 320, an emitter 325, and a collector 330. The first junction 310 is electrically connected to the signal line 85. The first junction 310 is electrically connected to the collector 330 by a ninth connection 340. The base 320 is connected to a second side of the first electrical resistance 245 by a tenth connection 345. The emitter 325 is electrically connected to a first side of the second electrical resistance 250 by an eleventh connection 350. A second side of the second electrical resistance 250 is electrically connected to the first protective conductor 80 by a twelfth connection 355.

The exemplary monitoring circuit 55, as shown in FIG. 4, comprises a switching device 360, a comparator circuit 365, and an energy supply 370. The switching device 360 can be configured, for example, as a relay. The energy supply 370 delivers a further electrical energy input in relation to ground at a second junction 375 of the monitoring circuit 55, at a supply voltage U. The supply voltage U has a predefined value, for example of 5 V. The second junction 375 is electrically connected to the comparator circuit 365 by a thirteenth connection 380. The comparator circuit 365 is electrically connected to the switching device 360.

The switching device 360 has a first circuit state and a second circuit state; the second circuit state is shown in FIG. 4. The switching device 360 is connected to the first electrical conductor 70 on a first terminal 385. On a second terminal 390, the switching device 360 is connected to the second electrical conductor 75. A third terminal 395 of the switching device 360 is connected to the second vehicle terminal 65 by the third electrical conductor 90. The fourth terminal 400 is electrically connected to the second vehicle terminal 65 by the fourth electrical conductor 95.

In the second circuit state of the switching device 360, shown in FIG. 4, the terminals 385, 390, 395, 400 are mutually electrically isolated. In the first circuit state, the switching device 360 is closed, and the first terminal 385 is electrically connected to the third terminal 295. In the first circuit state, the second terminal 390 is electrically connected to the fourth terminal 400.

Figure 5:
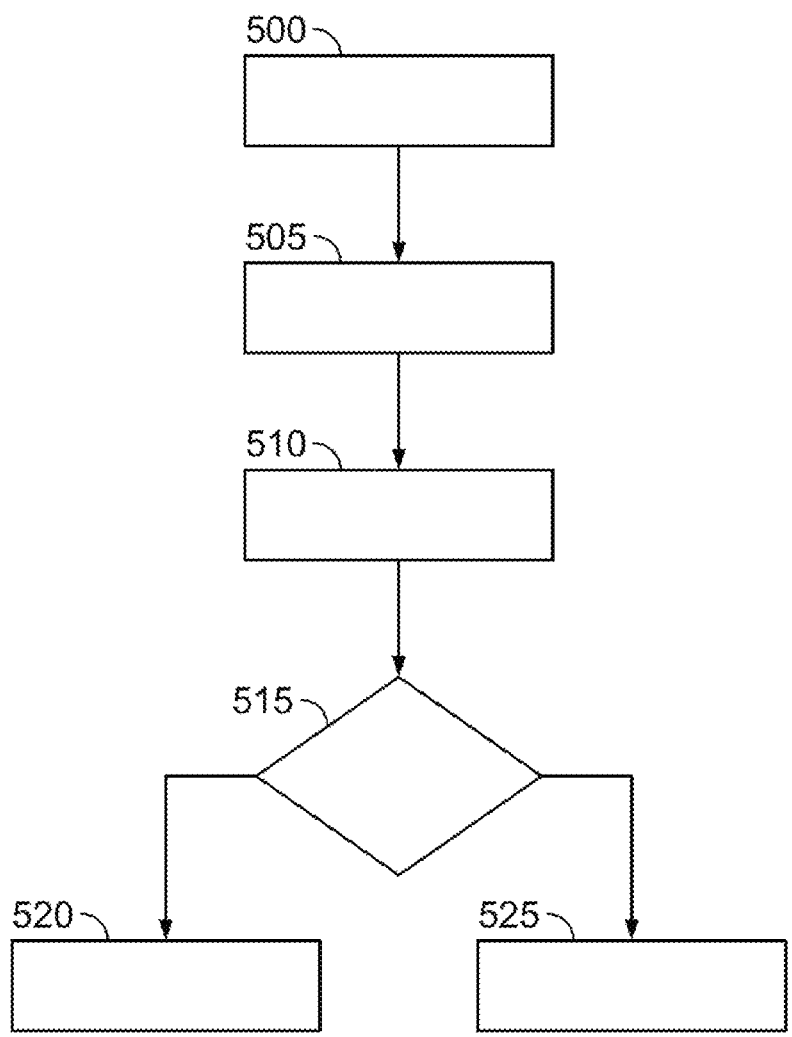
FIG. 5 is a flowchart of a method of operation of the charging system of FIG. 1.

A method of using the charging system 10 is shown in FIG. 5.

In a first process step 500, the mains plug 45 is inserted in the socket outlet 110, and the contact element 120, 125 is electrically connected to the socket outlet 110. The charging device 25 can be activated. The switching device 360 is in the first circuit state. Electrical energy supplied by the AC voltage network is thus transmitted via the mains plug 45, the first cable 50, the switching device 360, the second cable 60, the vehicle terminals 30, 65, and the second connection 40 to the charging device 25. The charging device 25 controls and/or regulates an electric current and/or an electric voltage of the electrical energy for the charging of the electrical energy accumulator 15 of the motor vehicle 20.

The further electrical energy is transmitted via the signal line 85 of the first cable 50 to the first junction 310. The further electrical energy is transmitted via the seventh connection 305 to the second supply terminal 285 of the proximity sensor 235. The proximity sensor 235 delivers further electrical energy to the first supply terminal 280. The further electrical energy is further transmitted via the fifth connection 275 to the second side 270 of the measuring capacitor 230. The measuring capacitor 230 is electrically charged by the further electrical energy. By the charging of the measuring capacitor, a first electric field 425 is generated around the first sensor electrode 185, and a second electric field 430 is generated around the second sensor electrode.

In a second process step 505, a user of the charging system 10 touches the first gripping area 155 and the second gripping area 165 with a part of their body, for example the fingers, in order to withdraw the mains plug 45 from the socket outlet 110. As a result, the first electric field 425 and the second electric field 430 are altered by the drain of charge from the electric fields 425, 430 to the human body part. As a result, the charging of the measuring capacitor 230 by the sensor electrode 185 is also altered.

The proximity sensor 235 detects the drain of charge of the measuring capacitor 230 by a change in a capacitor voltage of the measuring capacitor 230 on the first supply terminal 280. On the signal terminal 290, the proximity sensor 235 delivers a signal which is constituted in accordance with the measured capacitor voltage. The signal is transmitted to the base 320 via the first electrical resistance 245, the sixth connection 300, and the tenth connection 345.

In a third process step 510, the bipolar transistor 240 switches through in response to the signal such that, from the energy supply 370, a further current of the further electrical energy flows via the signal line 85, the first junction 310 and the ninth connection 340 through the bipolar transistor 240 to the eleventh connection 350. The further electrical energy is converted into heat in the second electrical resistance 250.

The energy supply 370 is designed to deliver the further electrical energy at a specific and predefined electric power rating. If the bipolar transistor 240 is switched through, the (supply) voltage on the second junction 375 dips in relation to ground. The voltage dip thus correlates to a corresponding through-switching of the bipolar transistor 240. If, for example, only one of the two gripping areas 155, 165 is touched, the voltage dip on the second junction 375 in relation to ground is smaller than in the event that both the gripping areas 155, 165 are touched, and a stronger drain of charge occurs on the measuring capacitor 230 than in the event that only one of the two gripping areas 155, 165 is touched.

In a fourth process step 515, the comparator circuit 365 detects a voltage on the second junction 375, in relation to ground. In the non-switched-through state of the bipolar transistor 240, the measured voltage corresponds to the supply voltage U. The comparator circuit 365 compares the voltage in relation to ground on the second junction 375 with a predefined threshold value. If the voltage detected on the second junction 375 is below the predefined threshold value, the comparator circuit 365 proceeds to the execution of a fifth process step 520. If the voltage detected on the second junction 375 exceeds the predefined threshold value, the comparator circuit 365 proceeds to the execution of a sixth process step 525.

In the fifth process step 520, the comparator circuit 365 switches the switching device 360 from a first circuit state to a second circuit state, such that the switching device 360 interrupts the electrical connection between the first terminal 385 and the third terminal 395, and between the second terminal 390 and the fourth terminal 400, and no electrical energy flows via the first and second electrical conductors 70, 75 to the charging device 25. Accordingly, the charging process for the charging of the electrical energy accumulator 15 of the motor vehicle 20 is interrupted. Switching of the switching device 360 from the first circuit state to the second circuit state proceeds more rapidly than a typical process for the withdrawal of the mains plug 45 from the socket outlet 110. The generation of an arc between the contact elements 120, 125 to the socket outlet 110 can be prevented accordingly.

If the measured electric voltage between the second junction 375 and ground exceeds the predefined threshold value, the comparator circuit 365 allows the switching device 360 to remain in the first circuit state, such that electrical energy continues to be transmitted from the first and second electrical conductors 70, 75 to the charging device 25, and the charging process for the charging of the electrical energy accumulator 15 is maintained.

The predefined threshold value is selected such that the predefined threshold value exclusively correlates to a touching of both gripping areas 155, 165, such that the proximity of the user to the mains plug 45, for example by inadvertent contact with only one of the two gripping areas 155, 165, by means of which no withdrawal of the mains plug 45 from the socket outlet 110 is executed, can be distinguished from a withdrawal process in which a human body part touches both of the gripping areas 155, 165.

Figure 6:
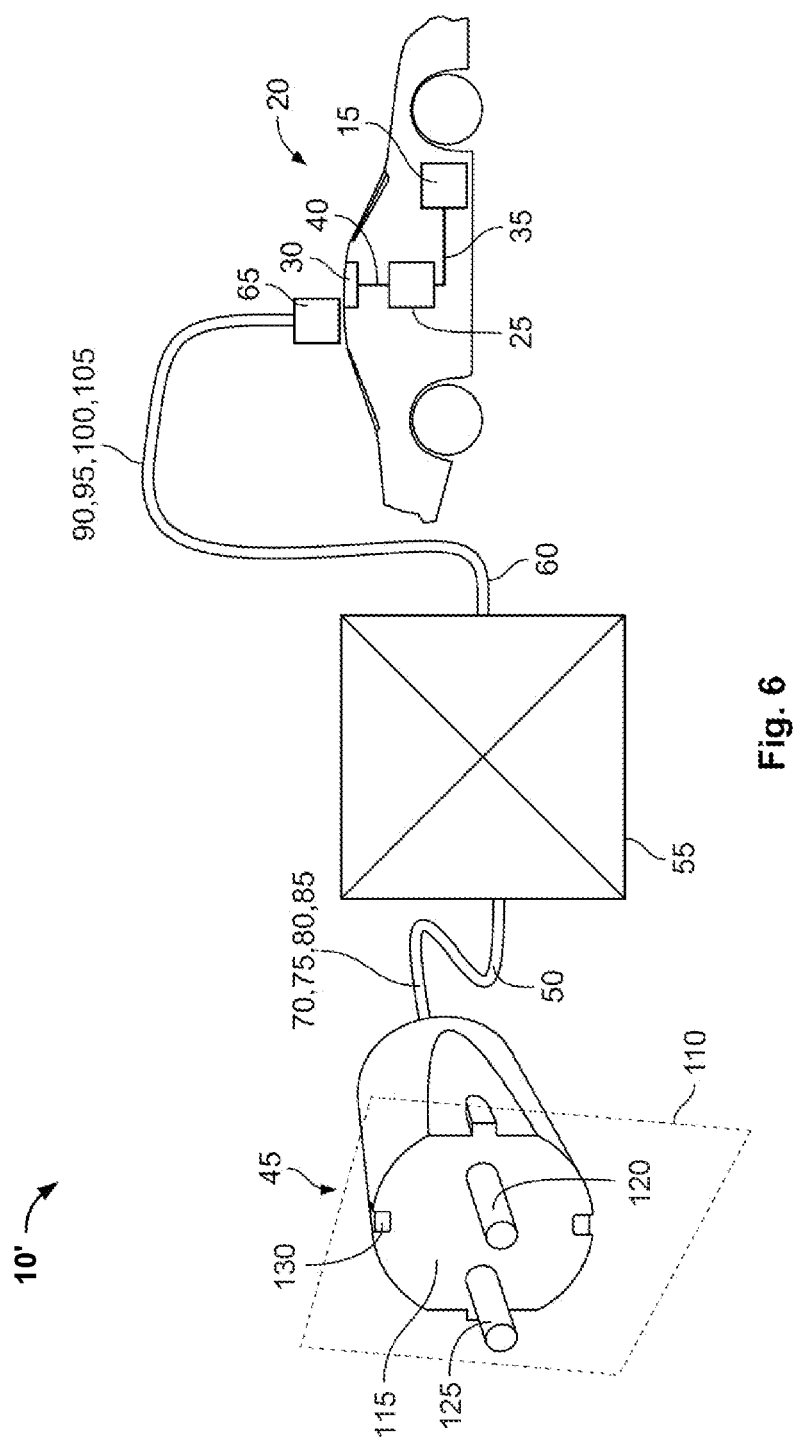
FIG. 6 is a schematic diagram of a charging system according to another embodiment.

A charging system 10' according to another embodiment is shown in FIG. 6. The charging system 10' is essentially of identical design to the charging system 10 shown in FIG. 1; like reference numbers refer to like elements. The charging system 10' differs in that the second cable 60 additionally incorporates a second signal line 105. The second signal line 105 connects the monitoring circuit 55 to the charging device 25, and is designed to transmit a control signal between the monitoring circuit 55 and the charging device 25.

Figure 7:
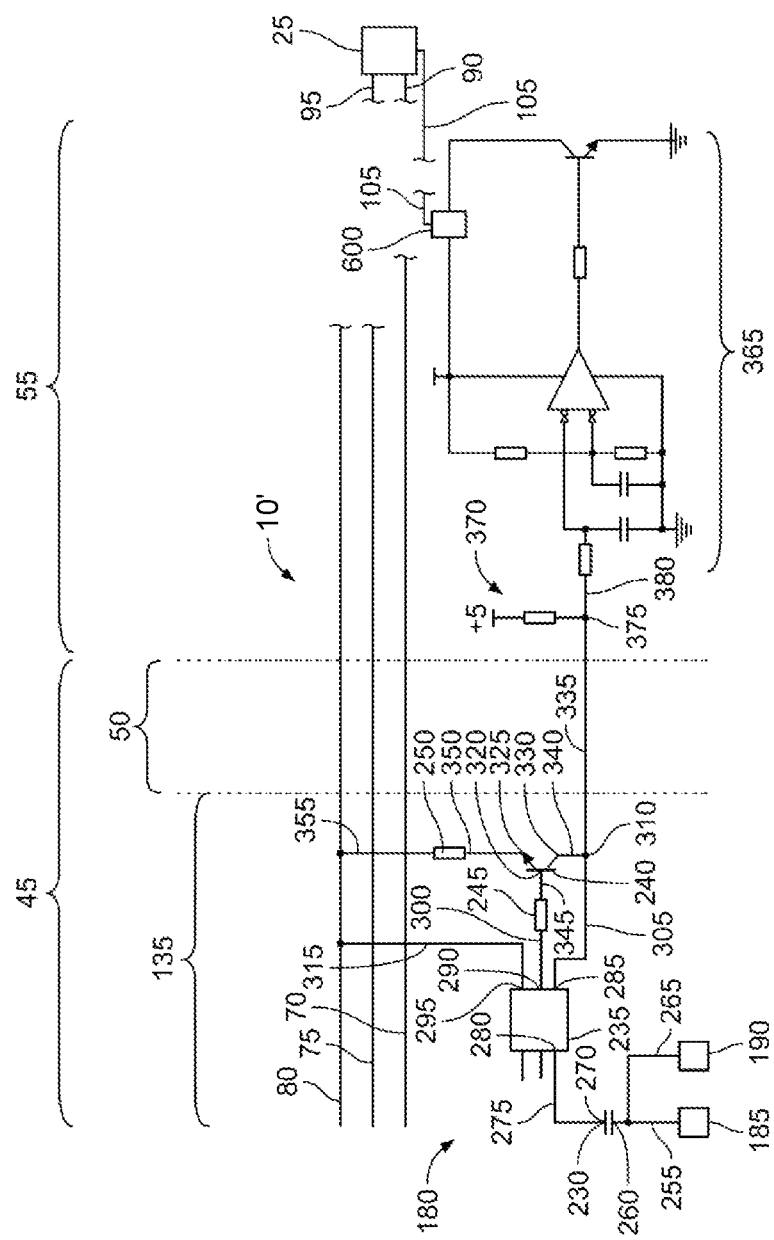
FIG. 7 is a circuit diagram of the charging system of FIG. 6.

A circuit diagram for the charging system 10' is shown in FIG. 7. The charging system 10' is essentially of identical design to the charging system 10 shown in FIG. 4; like reference numbers refer to like elements. The circuit diagram of the charging system 10' differs in that the switching device 360 is omitted and a transmitter 600 is provided in place of the switching device 360. The transmitter 600 is connected to the charging device 25 by the second signal line 105. The transmitter 600 can, for example, deliver a pulse-width-modulated signal to the charging device 25. The first and second electrical conductor 70, 75 in the monitoring circuit is permanently connected to the third and fourth electrical conductor 90, 95.

The operation of the charging system 10' proceeds in a similar manner to that described in FIG. 5. The first to fourth process steps 500 to 515 are identical to the first to fourth process steps 500 to 515 described in FIG. 5. A difference is provided in that, in the fifth process step 520, the monitoring circuit 55, upon the undershoot of the threshold value by the voltage on the second junction 375, transmits a first control signal to the charging device 25 with the transmitter 600. The charging device 25 detects the first control signal, wherein the charging device 25, on the basis of the first control signal, interrupts the charging process of the electrical energy accumulator 15.

In the sixth process step 525, the monitoring circuit 55, via the transmitter 600, delivers a second control signal to the charging device 25 with the transmitter 600. The charging device 25 detects the second control signal and, on the basis of the second control signal, the charging device 25 maintains the execution of the charging process.

In other embodiments, the charging system 10 can be configured with a different design. It is conceivable that both the sensor unit 135 and the monitoring circuit 55 can be configured with a different design. The representation of the monitoring circuit 55 in FIGS. 4 and 7 is merely exemplary; the monitoring circuit 55 can also be configured as a digital circuit, which evaluates a digital signal which is delivered by the proximity sensor 235.

What is claimed is:

1. A mains plug for connecting a charging system of a motor vehicle to a socket outlet of an alternating current network, comprising:
   a contact housing having a first gripping area; and
   a sensor unit having a first sensor electrode embedded in the contact housing, a first section of the contact housing is arranged between a first surface of the first gripping area and the first sensor electrode, the sensor unit has a sensor circuit embedded in the contact housing and electrically connected to the first sensor electrode, the sensor circuit has a measuring capacitor and a capacitive proximity sensor connected to the measuring capacitor, the first sensor electrode is electrically connected to a first side of the measuring capacitor and a second side of the measuring capacitor is connected to a supply terminal of the proximity sensor.

2. The mains plug of claim 1, wherein the first gripping area is at least partially delimited by a projection, the first sensor electrode is arranged at least partially adjacently to the projection.

3. The mains plug of claim 2, wherein the projection has a projection outline, the first sensor electrode is arranged at least partially in parallel with the projection outline.

4. The mains plug of claim 1, further comprising a contact element electrically connected to an electrical conductor, a contact element section of the contact element is embedded in the contact housing.

5. The mains plug of claim 4, wherein the contact element has a pin section projecting from the contact housing and extending in a plug-in direction of the mains plug.

6. The mains plug of claim 4, wherein the first gripping area is at least partially offset in relation to the contact element and is oriented in parallel with the plug-in direction.

7. The mains plug of claim 1, further comprising a protective conductor and a protective contact electrically connected to the protective conductor, the protective contact is mechanically connected to the contact housing.

8. The mains plug of claim 1, wherein the contact housing has a second gripping area, the first gripping area and the second gripping area are arranged with a mutual clearance.

9. The mains plug of claim 8, wherein the sensor unit has a second sensor electrode, a second section of the contact housing is arranged between a second surface of the second gripping area and the second sensor electrode.

10. The mains plug of claim 9, wherein the contact housing has a third section arranged between the first sensor electrode and the second sensor electrode, the third section electrically isolates the first sensor electrode from the second sensor electrode.

11. The mains plug of claim 9, wherein the first sensor electrode is electrically connected to the second sensor electrode.

12. The mains plug of claim 1, wherein the first sensor electrode is arranged in a plane parallel with the first surface.

13. The mains plug of claim 1, wherein the first sensor electrode is an electrically-conductive plastic and/or a wire and/or a leadframe.

14. The mains plug of claim 1, wherein the contact housing is formed of an electrically insulating plastic.

15. The mains plug of claim 1, further comprising a signal line connectable to a monitoring circuit.

16. The mains plug of claim 15, wherein the sensor circuit includes an NPN-doped bipolar transistor having a base, an emitter, and a collector, the base is electrically connected to a signal terminal of the proximity sensor, the emitter is electrically connected to a protective conductor, and the collector is connected to the signal line.

17. The mains plug of claim 16, wherein the sensor circuit has a first predefined electrical resistance and a second predefined electrical resistance, the first predefined electrical resistance is arranged between the base and the signal terminal of the proximity sensor, the second predefined electrical resistance is arranged between the emitter and the protective conductor.

18. A charging system for charging an electrical energy accumulator of a motor vehicle, comprising:
a mains plug including a contact housing having a first gripping area, a sensor unit having a first sensor electrode embedded in the contact housing, and a contact element disposed in the contact housing, a first section of the contact housing is arranged between a first surface of the first gripping area and the first sensor electrode;
a vehicle terminal; and
a monitoring circuit electrically connected to the contact element by an electrical conductor, the monitoring circuit has a first circuit state and a second circuit state, the monitoring circuit electrically connects the electrical conductor to the vehicle terminal in the first circuit state and electrically isolates the electrical conductor from the vehicle terminal in the second circuit state.

19. The charging system of claim 18, wherein the sensor unit is adapted to reduce a voltage in the event of contact with the first gripping area and the monitoring circuit is adapted to detect the reduced voltage and to switch from the first circuit state to the second circuit state.

20. The charging system of claim 18, further comprising a signal line electrically connecting the monitoring circuit to the sensor unit.

21. The charging system of claim 20, further comprising a charging device having a first operating state and a second operating state, the charging device is adapted to charge the electrical energy accumulator in the first operating state and the charging of the electrical energy accumulator is interrupted in the second operating state.

* * * * *